Dec. 16, 1930.   J. R. JACKSON, JR   1,784,933

ELEVATOR CONTROL DEVICE

Filed April 14, 1928

Inventor:
Joseph R. Jackson, Jr.
by Henry T. Williams,
Atty.

Patented Dec. 16, 1930

1,784,933

UNITED STATES PATENT OFFICE

JOSEPH R. JACKSON, JR., OF BOSTON, MASSACHUSETTS

ELEVATOR-CONTROL DEVICE

Application filed April 14, 1928. Serial No. 270,133.

The invention to be hereinafter described relates to a control device for electric elevators.

In my copending application Serial No. 233,119, filed November 14, 1927, which has matured into a Patent No. 1,758,605, May 13, 1930, for electric elevator system, is shown a car provided with a machine which weighs the load on the car, and this machine is utilized to regulate the speed of the car operating electric motor, the dynamic brake, and the mechanical brake for said motor.

In effecting the regulation by the weighing machine, a selector device is employed, and in said application the selector is actuated and preset by operation of the weighing machine in the car, and this selector controls electric circuits and instrumentalities which are fully shown and described in said application, to which reference may be had for an understanding thereof.

In some installations it may be desirable to omit the weighing machine and to have the selector under the control of the operator in the car, the construction being such that he can make a general estimate of the load on the car, and manually preset the selector accordingly. A purpose of the present invention is to provide a selector which may be controlled by the operator in the car.

Another purpose of the invention is to provide a selector having certain features in its construction and design adapting it either to an installation in which a weighing machine is employed in the car, or to an installation in which the selector is under manual control.

The character of the invention may be best understood by reference to the following description of an embodiment thereof shown in the accompanying drawing, wherein.

Figure 1:
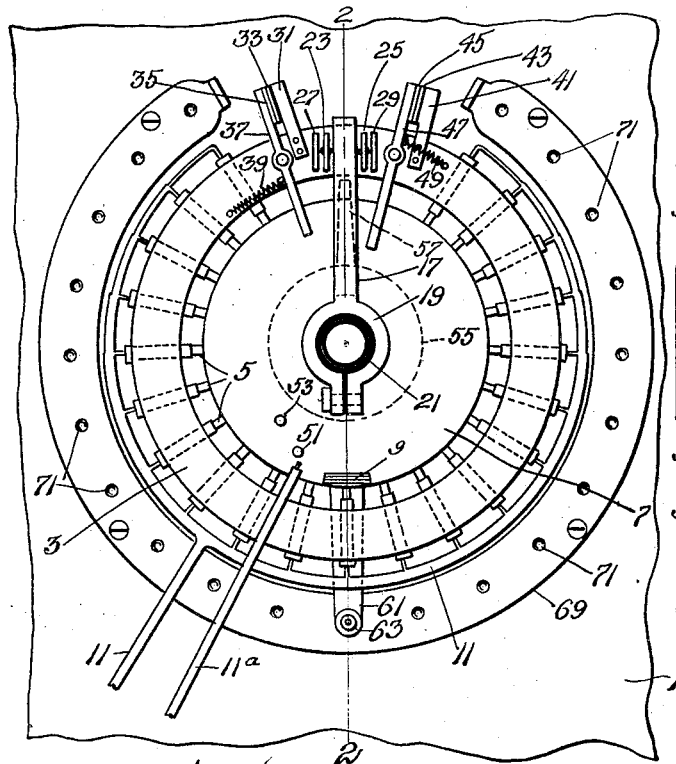
Fig. 1 is a view of a portion of a wall of an elevator car, and the selector applied to the outside face thereof.
Figure 2:
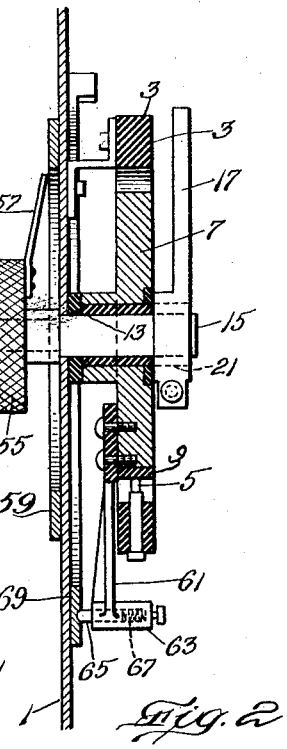
Fig. 2 is a vertical section taken on line 2—2 of Fig. 1.
Figure 3:
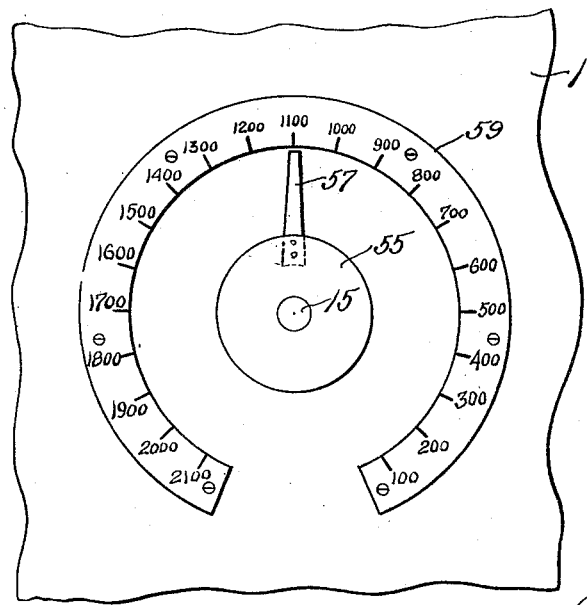
Fig. 3 is a view of the indicator for the selector applied to the inside of the wall.
Figure 4:
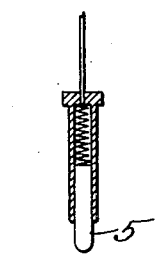
Fig. 4 is a sectional detail of one of the spring-pressed contacts.

Referring to the drawing, 1 designates a portion of a wall of an elevator car which carries the selector, in the present instance of the invention comprising a ring 3 of insulation material and mounted on said wall and carrying a series of spring-pressed contact pins or brushes 5 which engage the periphery of a disk or rotor 7 of conductive material, with the exception of an insulation spot 9. These contacts are connected to wires enclosed in a cable 11. The rotor has a hub 13 fast on a shaft 15 extending through a bearing in the wall. Mounted on the shaft is an arm 17 having a split sleeve 19, an insulation sleeve 21 being interposed between the hub and shaft. The split sleeve may be tightened into proper frictional engagement with the insulation sleeve. The arm 17 carries contact buttons 23 and 25 at opposite sides thereof, and cooperating respectively with contact buttons 27 and 29 mounted on the ring 3. The construction is such that when the shaft 15 is rotated in a contra-clockwise direction (Fig. 1), it will cause the contact 23 to engage the contact 27, and when said shaft is rotated in a clockwise direction, it will cause the contact 25 to engage the contact 29. These operations will occur on initial turning of the rotor, but will not interfere with further turning of the rotor due to the frictional connection of the arm 17 with the shaft.

Mounted on the ring 3 is a bracket 31 carrying a contact 33 cooperating with a contact 35 on a lever 37 pivoted intermediate its ends on the ring. A coil spring 39 connected to the ring and lever tends to hold the contact 35 in engagement with the contact 33.

Also mounted on the ring is a bracket 41 carrying a contact 43, and cooperating therewith is a contact 45 on a lever 47 pivotally mounted intermediate its ends on the ring. A coil spring 49 connected to the lever and ring tends to hold the contact 45 in engagement with the contact 43. In the course of turning of the rotor, a pin 51 will engage the lever 37 and move the contact 35 away from the contact 33, and a pin 53 on the rotor will engage the lever 47 and move the contact 45 away from contact 43.

The contacts controlled by the arm 17 may be in electric circuits for controlling the direction of an electric motor. The contacts 33 and 35 may be in a circuit for preventing starting of the car when overloaded. The contacts 43 and 45 may be in a circuit for performing an operation to indicate that the car is fully loaded.

To enable the operator of the car to turn the rotor to preset the selector in accordance with variations in the load on the car, a hand wheel 55 is mounted fast on the shaft 15 at the inside of the car wall. To indicate the adjustments of the rotor, a pointer 57 is provided on the hand wheel, and cooperates with a scale on a ring segment 59 secured to the inside of the wall. This scale may be marked with graduations, and in the present instance it is marked with numbers 100 to 2100 representing 100 pound increments in the load on the car.

To hold the rotor in its different positions of adjustment, the rotor has an arm 61 secured thereto carrying a boss 63 containing a pin 65 pressed outward by a coil spring 67 into engagement with a ring segment 69 provided with a series of indentations 71 corresponding to and in radial alinement with the spring-pressed contact pins 5 referred to.

The construction is such that the operator may grasp the hand wheel 55 and turn the rotor to the position desired, and in the course of this movement the spring-pressed pin 65 will slick along the ring segment 69 and over indentations 71, and on completion of such an adjustment, the spring-pressed pin 65 will enter one of the indentations and hold the rotor in the position to which it is adjusted.

The wires connected to the contact pins 5 and enclosed in the cable 11 may lead to a position machine such as disclosed in the aforesaid application, and comprises rows of contacts, contact bars and bridge contacts on a carrier having a nut threaded on a screw shaft and rotated by an electric motor. Initial rotation of the hand wheel 55 and the rotor will rock the arm 17 and cause the contact 23 thereon to engage contact 27 on the ring, or cause contact 25 on the arm to engage contact 29 on the ring, depending on whether the hand wheel is turned to the left or to the right (Fig. 1). These contacts are in circuits for controlling the direction of rotation of the position machine motor.

The operator in the car will estimate the weight of the load therein, and turn the hand wheel so that the pointer will be at the number of the indicator scale corresponding to the estimated load. The turning of the hand wheel to this position will bring the insulation spot 9 on the rotor opposite one of the contact pins 5.

Current is supplied to the conductive rotor by wire 11a. The wires in cable 11 lead to contacts of rows of contacts of the position machine, and the arrangement of the circuits is such that current will stand on all of the contacts of said row with the exception of the wire which leads to the selector pin opposite the insulation spot of the rotor. When the motor is rotated to carry the bridge contact into engagement with this contact, the circuit for the motor will be interrupted, and it will be arrested.

If the load is beyond the maximum, the operator will have turned the rotor so that the pin 51 will rock lever 37 and separate the contact 35 from the contact 33, and in such event the circuit for the car driving motor will be interrupted and the car will not start.

When the car is fully loaded but not overloaded, the pin 53 will rock the lever 47, thereby separating contact 45 from contact 43. These contacts are in a circuit which will prevent the car from responding to pressure of a push button at a floor, and in the case of a bank of cars, will set the system so that another car of the bank will respond to the floor call.

Since the instrumentalities controlled by the selector are fully presented in the aforesaid application, it is unnecessary further to describe them herein.

It will be understood that the invention is not limited to the specific embodiment shown, and that various deviations may be made therefrom without departing from the spirit and scope of the appended claims.

What is claimed is:

1. In an electric elevator control, a selector comprising a rotor having conducting and insulation portions, a ring, a series of spring-pressed contact pins carried by the ring and engaging the rotor, and manually operable means for turning the rotor to set the same in different positions of rotative adjustment.

2. In an electric elevator control, a shaft, a rotor thereon having conducting and insulation portions, a support, a series of spring-pressed contact pins carried by the support and engaging the rotor, and a hand wheel on the shaft for turning the rotor to set the same in different positions of rotative adjustment.

3. In an electric elevator control, a shaft, a rotor thereon having conducting and insulation portions, a support, a series of spring-pressed contact pins carried by the support and engaging the rotor, manually operable means for turning the rotor to set the same in different positions of rotative adjustment, and means for indicating the positions of adjustment of the rotor.

4. In an electric elevator control, a shaft, a rotor thereon having conducting and insulation portions, a support, a series of spring-pressed contact pins carried by the support and engaging the rotor, manually operable means for turning the rotor to set the same in different positions of rotative adjustment, a dial having graduations thereon and numbers representing increments of weight, and a pointer movable with the rotor and associated with the scale.

5. In an electric elevator control, a shaft, a rotor thereon having conducting and insulation portions, a support, a series of spring-pressed contact pins carried by the support and engaging the rotor, manually operable means for turning the rotor to set the same in different positions of rotative adjustment, and means for holding the rotor in its different positions of adjustment.

6. In an electric elevator control, a shaft, a rotor thereon having conducting and insulation portions, a support, a series of spring-pressed contact pins carried by the support and engaging the rotor, manually operable means for turning the rotor to set the same in different positions of rotative adjustment, a member having a series of indentations therein, an arm carried by the rotor, and a spring-pressed pin on the arm adapted to slick past the indentations and enter one or another of said indentations to hold the rotor in its selected position of adjustment.

7. In an electric elevator control, a shaft, a rotor thereon having conducting and insulation portions, a support, a series of spring-pressed contact pins carried by the support and engaging the rotor, manually operable means for turning the rotor to set the same in different positions of rotative adjustment, an arm mounted on and frictionally connected to the shaft, contacts on the arm, and contacts on the support adapted to be engaged by one or the other of the arm contacts on initial turning of the rotor.

8. In an electric elevator control, a shaft, a rotor thereon having conducting and insulation portions, a support, a series of spring-pressed contact pins carried by the support and engaging the rotor, manually operable means for turning the rotor to set the same in different positions of rotative adjustment, a contact on the support, a lever pivotally mounted on the support, a contact on the lever for engagement with the support contact, and an element on the rotor for rocking the lever to separate said contacts.

9. In an electric elevator control, a shaft, a rotor thereon of conductive material having an insulation spot, a support, and a series of spring-pressed contact pins carried by the support and engaging the periphery of the rotor, the latter being adapted to be turned to bring said spot in engagement with any one of said contact pins.

JOSEPH R. JACKSON, Jr.